April 11, 1933.　　　　E. BROWN　　　　1,903,436
METHOD OF AND MEANS FOR THE MANUFACTURE OF PIPE FITTINGS
Filed July 3, 1931

Inventor:
Edmund Brown,
By Jas. C. Wobensmith
Attorney.

Patented Apr. 11, 1933

1,903,436

UNITED STATES PATENT OFFICE

EDMUND BROWN, OF PALMYRA, NEW JERSEY

METHOD OF AND MEANS FOR THE MANUFACTURE OF PIPE FITTINGS

Application filed July 3, 1931. Serial No. 548,519.

My invention relates to the manufacture of pipe fittings, and more particularly to an improved method of and means for forming pipe fittings such as elbows, return bends, and the like, from tubes of metal such as short lengths of pipe.

The principal object of my invention is to provide an improved method of and means for making pipe fittings such as elbows and return bends, whereby the same may be readily and economically made from short lengths of pipe, and which fittings will be characterized by having substantially uniform wall thicknesses throughout.

My invention contemplates the manufacture of pipe fittings, which may, if desired, be provided with straight tangential extensions at the ends thereof. The straight end portions may be threaded, or may have flanges attached thereto in any preferred manner, for the purpose of securing the fittings in the usual manner in the pipe systems in which they are used.

My invention finds a valuable application in the manufacture of pipe fittings, which are adapted to be welded to adjacent lengths of pipe or other fittings without the use of threads or flanges, as is now becoming a common practice.

The nature and characteristic features of my invention will be more readily understood from the following description, taken in connection with the accompanying drawing forming part hereof, in which.

Figure 1:
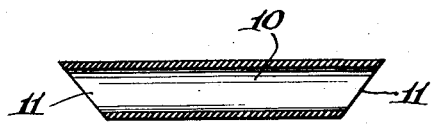
Figure 1 is a longitudinal sectional view of a metal tube or piece of pipe, from which an elbow is to be formed.

It will, of course, be understood that the drawing and description herein contained are illustrative merely, and that various changes and modifications may be made without departing from the spirit of my invention.

In Fig. 1 of the drawing, there is shown a metal tube or a short length of pipe 10, from which an elbow fitting is to be formed. It will be noted that the ends 11 of the tube are obliquely inclined, the length on the long side of the tube being substantially equal to the length of the arc on the outer side of the finished fitting, plus the length of the straight tangential end portions; and the length on the short side of the tube is substantially equal to the length of the arc on the inner side of the finished fitting, plus the length of the straight tangential end portions.

Of course, if the finished fitting is to be made without the straight tangential end portions, the initial lengths correspond merely to the lengths of the respective arcs, and also, if the ends are to be trimmed for any purpose, suitable allowance is made for such trimming.

Figure 2:
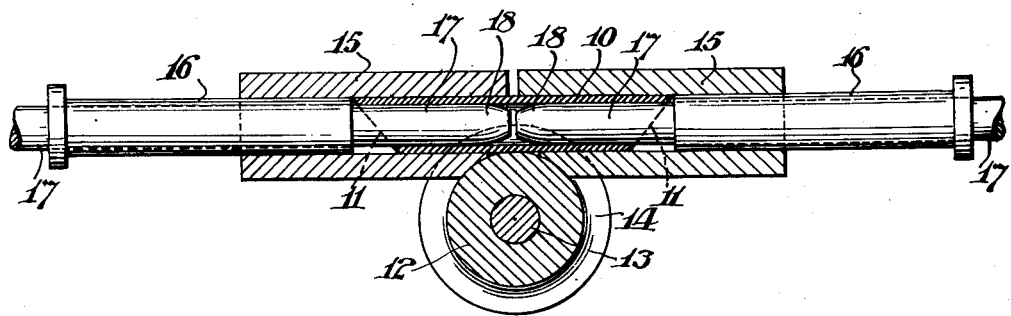
Fig. 2 is a longitudinal sectional view of preferred means for shaping the tube to the elbow form, the parts being shown in the positions assumed at the beginning of the shaping operation.
Figure 3:
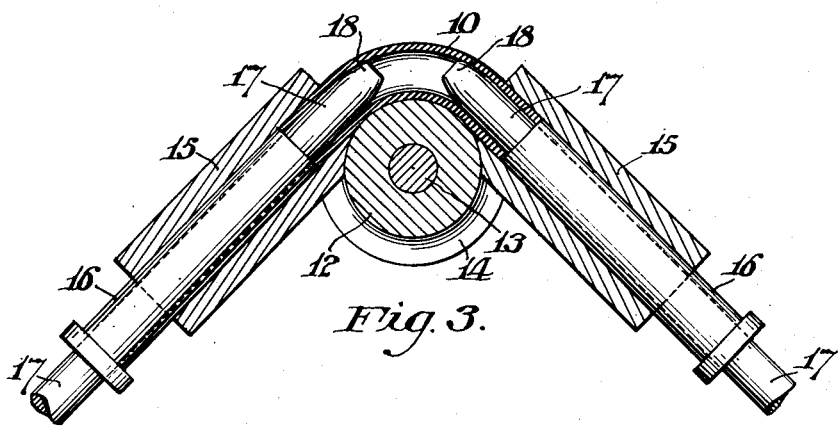
Fig. 3 is a view similar to Fig. 2, but with the parts in the positions assumed at the end of the shaping operation.

Referring now to Figs. 2 and 3 of the drawing, 12 is a forming member, preferably made in circular form and mounted upon a shaft 13. The forming member 12 is provided with an annular groove 14 complemental to the external diameter of the tube from which the fitting is made.

A pair of sleeves 15 are so mounted with respect to the forming member 12 as to be rotatably movable about the axis thereof, the arrangement being such that the axes of the sleeves are at all times tangential to an arc struck from the axis of the forming member. The internal diameter of each of the sleeves 15 corresponds to the external diameter of the tube 10 from which the fitting is formed.

Each of the sleeves 15 has a bushing 16 slidably mounted therein. During the forming operation, the inner ends of bushings 16 bear against the ends of the metal tube 10 from which the fitting is formed, suitable mechanism, not shown, being provided to cause the bushings 16 to press against the ends of the tube 10 with the requisite amount of pressure.

Within each bushing 16 a mandrel 17 is slidably mounted. The diameter of the mandrel 17 corresponds to the internal diameter of the tube 10 from which the fitting is formed. The inner end of each mandrel 17 is suitably shaped, as at 18, complementally to the curvature of the inner surface of the outer curve of the wall of the finished fitting. Suitable mechanism, not shown, is provided whereby the ends 18 of the mandrels 17 bear against and support the outer curve of the wall of the fitting, whereby improper deformation during the forming operation will be prevented.

The relative movement of the various parts is so coordinated that, as the tube 10 is shaped from the form shown in Fig. 2 to that shown in Fig. 3, the metal of the tube will be caused to flow in such manner that the wall thickness of the fitting will be maintained substantially uniform throughout, the proper shifting of the metal being insured by the pressure of the bushings 16 against the ends thereof, and the outer curve being supported against collapse by the inner ends 18 of the mandrels 17.

It will be found that in some instances the pressure against the ends of the tube may be so regulated as to cause the metal to flow in such manner that there will be no tendency of the outer curve to collapse, in which cases the supporting of the same by the inner ends 18 of the mandrel 17 may be dispensed with.

It will be noted that when the forming operation is completed, as shown in Fig. 3 of the drawing, the fitting may be provided with short, straight, and tangentially extending end portions, and that the ends of the fitting may be squared off, or otherwise suitably shaped.

It will of course be understood that any desired degree of curvature may be imparted to the tube 10, depending upon the amount of movement of the sleeves 15 and the associated parts about the axis of the forming member 12.

Fittings formed in this manner will be of substantially the same diameter as the initial tube. The necessary manipulation of the metal is reduced to a minimum, and there is no stretching of the same such as would be likely to cause internal stresses in the finished fitting. The operations may be carried out rapidly and economically, and where the straight tangentially extending end portions are required on the fitting, no subsequent manipulation is necessary to straighten the same.

I claim:

1. The method of making pipe fittings which consists in taking a section of metal tube having oblique ends, bending the same over an external curved form, imparting pressure to the ends of the tube during the bending operation, and internally supporting the outer curve of the tube against collapse during the bending operation.

2. The method of making pipe fittings which consists in taking a section of metal tube having oblique ends, bending the same over an external curved form, and imparting pressure to both ends of the tube during the bending operation.

3. The method of making pipe fittings which consists in taking a section of metal tube having oblique ends, bending the same over an external curved form by sleeves engaging the ends of the tube, and imparting pressure to both ends of the tube during the bending operation.

4. The method of making pipe fittings which consists in taking a section of metal tube having oblique ends, bending the same over an external curved form by sleeves engaging the ends of the tube, imparting pressure to both ends of the tube during the bending operation, and internally supporting the outer curve of the tube against collapse during the bending operation.

5. The method of making pipe fittings which consists in taking a section of metal tube having oblique ends, bending the same over an external curved form by sleeves engaging the ends of the tubes, and imparting pressure to both ends of the tube during the bending operation by bushings movably mounted within the sleeves.

6. The method of making pipe fittings which consists in taking a section of metal tube having oblique ends, bending the same over an external curved form by sleeves engaging both ends of the tube, imparting pressure to the ends of the tube during the bending operation by bushings movably mounted within the sleeves, and supporting the outer curve of the tube against collapse during the bending operation by movable internal mandrels.

7. The method of making pipe fittings which consists in taking a section of metal tube having oblique ends, bending the same over an external curved form, engaging both ends of the tube during the bending operation by sleeves corresponding in internal diameter to the external diameter of the tube, imparting pressure to the ends of the tube during the bending operation by bushings movably mounted within the sleeves, and internally supporting the ends of the tube and the outer curve thereof against collapse during the bending operation by movable internal mandrels.

8. Means for forming pipe fittings from tubes comprising a curved form over which a section of tube is adapted to be bent, movable sleeves for engaging the ends of the tube during the bending operation, and bushings slidably mounted in said sleeves adapted to impart pressure to the ends of the tube during the bending operation.

9. Means for forming pipe fittings from tubes comprising a curved form over which a section of tube is adapted to be bent, the form having a groove complemental to the external diameter of the tube, sleeves for engaging the ends of the tube during the bending operation, and bushings slidably mounted in said sleeves adapted to impart pressure to the ends of the tube during the bending operation.

10. Means for forming pipe fittings from tubes comprising a curved form over which a section of tube is adapted to be bent, sleeves for engaging the ends of the tube during the bending operation, said sleeves being movable about the axis of the form with their respective axes tangential to an arc struck from the axis of the form, and bushings slidably mounted in said sleeves adapted to impart pressure to the ends of the tube during the bending operation.

11. Means for forming pipe fittings from tubes comprising a curved form over which a section of tube is adapted to be bent, the form having a groove complemental to the external diameter of the tube, sleeves for engaging the ends of the tube during the bending operation, said sleeves being movable about the axis of the form with their respective axes tangential to an arc struck from the axis of the form, bushings slidably mounted in said sleeves adapted to impart pressure to the ends of the tube during the bending operation.

12. Means for forming pipe fittings from tubes comprising a curved form over which a section of tube is adapted to be bent, the form having a groove complemental to the external diameter of the tube, sleeves for engaging the ends of the tube during the bending operation, said sleeves being movable about the axis of the form with their respective axes tangential to an arc struck from the axis of the form, bushings slidably mounted in said sleeves adapted to impart pressure to the ends of the tube during the bending operation, and mandrels slidably mounted in said bushings, and the ends of said mandrels being shaped complementally to the outer curve of the tube, and adapted to support the same against collapse during the bending operation.

13. Means for forming pipe fittings from tubes comprising a curved form over which a section of tube is adapted to be bent, the form having a groove complemental to the external diameter of the tube, sleeves for engaging the ends of the tube during the bending operation, said sleeves being movable about the axis of the form with their respective axes tangential to an arc struck from the axis of the form, bushings slidably mounted in said sleeves adapted to impart pressure to the ends of the tube during the bending operation, and mandrels slidably mounted in said bushings, said mandrels internally supporting the ends of the tube during the bending operation.

14. Means for forming pipe fittings from tubes comprising a curved form over which a section of tube is adapted to be bent, the form having a groove complemental to the external diameter of the tube, sleeves for engaging the ends of the tube during the bending operation, said sleeves being movable about the axis of the form with their respective axes tangential to an arc struck from the axis of the form, bushings slidably mounted in said sleeves adapted to impart pressure to the ends of the tube during the bending operation, and mandrels slidably mounted in said bushings, said mandrels internally supporting the ends of the tube during the bending operation, and the ends of said mandrels being shaped complementally to the outer curve of the tube and adapted to support the same against collapse during the bending operation.

In testimony whereof, I have hereunto signed my name.

EDMUND BROWN.